United States Patent [19]

Kommoss et al.

[11] Patent Number: 4,481,832

[45] Date of Patent: Nov. 13, 1984

[54] TEST CASSETTE FOR MEASURING THE TORQUE OF A WINDING MANDREL OF A CASSETTE-PLAYING APPARATUS

[75] Inventors: Klaus Kommoss, Wetzlar-Naunheim; Erhard Schmidt, Giessen-Lützellinden, both of Fed. Rep. of Germany

[73] Assignee: U.S. Philips Corporation, New York, N.Y.

[21] Appl. No.: 421,938

[22] Filed: Sep. 23, 1982

[30] Foreign Application Priority Data

Oct. 28, 1981 [DE] Fed. Rep. of Germany ........ 3142685

[51] Int. Cl.³ .............................................. G01L 3/00
[52] U.S. Cl. ................. 73/862.08; 73/862.44
[58] Field of Search ............... 73/1 C, 862.19, 862.44, 73/862.08, 9

[56] References Cited

U.S. PATENT DOCUMENTS 2,471,423 5/1949 Gisser ........................................ 73/9
3,273,385 9/1966 Donnelly et al. ............. 73/862.08 X
3,942,367 3/1976 Thompson ................... 73/862.44 X
4,257,262 3/1981 Stanton ............................ 73/862.08

FOREIGN PATENT DOCUMENTS 2932526 2/1981 Fed. Rep. of Germany ........ 280/42

Primary Examiner—Charles A. Ruehl
Assistant Examiner—Brian R. Tumm
Attorney, Agent, or Firm—David R. Treacy

[57] ABSTRACT

A torque-measuring test cassette having at least one annular member arranged to engage a winding mandrel of a tape cassette apparatus. A resilient metal strip extending radially from each annular member has a far end arranged to be guided in a slot in the test cassette housing, so that a strip can bend as a result of torque imparted to the annular member by a winding mandrel. Each strip has a strain gauge attached to at least one side to permit remote electrical measurement of bending of the strip and thus the torque exerted by the mandrel.

9 Claims, 2 Drawing Figures

TEST CASSETTE FOR MEASURING THE TORQUE OF A WINDING MANDREL OF A CASSETTE-PLAYING APPARATUS

BACKGROUND OF THE INVENTION

The invention relates to a test cassette for measuring the torque of a winding mandrel of an apparatus for recording and/or playing back signals on and/or from a magnetic tape wound on reel hubs in a cassette (hereinafter referred to as a tape cassette apparatus), the apparatus comprising winding mandrels with which the reel hubs engage to receive torque therefrom.

German Offenlegungsschrift No. 29 32 526 discloses a test cassette in which there is arranged a spring balance which measures the dragging force of a tape which is wound around the reel hub driven by the winding mandrel. A problem associated with this known test cassette is that when it is used in a closed apparatus, for example a car-radio/cassette recorder, the measurement values indicated by the spring balance cannot be read directly from the spring balance. For reading the measurement values DE-OS No. 29 32 526 describes a special measuring indicator which is coupled to a narrow side of the cassette via a mechanical cable system. A disadvantage of this arrangement is that the cassette insertion slot must be visible to the person carrying out the test.

SUMMARY OF THE INVENTION

It is an object of the invention to provide a test cassette which enables the measurement values to be read independently of the test location and the location of the cassette, so that torque measurement values can also be read in the case of apparatus in which the winding mandrels are not exposed.

According to the invention a test cassette for measuring the torque of a winding mandrel of a tape cassette apparatus comprises a housing; an annular member having a central axis, which member is rotatably supported in the housing so as to permit rotation about the central axis and which is constructed and arranged for engagement with a winding mandrel of the apparatus to receive torque therefrom about the central axis; a resilient elongated metal strip which is connected at one end to the annular member so as to extend substantially radially therefrom with the lateral direction of the strip extending parallel to the central axis of the annular member, and which at the other end is guided in the housing for movement in a direction such that the strip can bend under the action of torque imparted to the annular member; and a strain gauge which is attached to a side of the strip so as to be responsive to bending thereof.

By the use of a strain gauge on a resilient metal strip it is possible to transmit the measurement values electrically to a measuring location which is independent of the location of the test cassette or the cassette-testing site. This results in a more flexible set-up of a test site or a measuring arrangement. In addition the electrical transmission of the measurement values also permits a digital display of these values, which is more accurate than the customary visually determined scale readings, which are frequently interpolated values.

In a further preferred embodiment of the invention a test cassette for measuring the torque of the winding mandrels of a tape cassette apparatus comprises a housing; two annular members each having a central axes, which members are rotatably supported in the housing to permit rotation about the respective central axis and which are constructed and arranged for engagement one with each of the winding mandrels of the apparatus to receive torque therefrom about the respective central axes; and two resilient elongated metal strips, each of which is connected at one end to a respective one of the annular members so as to extend substantially radially therefrom with the lateral direction of the strip extending parallel to the central axis of the annular member, and each of which at the other end is guided in the housing for movement in a direction such that the strip can bend under the action of torque imparted to the respective annular member, the two strips extending in opposite radial directions from the respective annular members; and a respective strain gauge attached to a side of each of the respective strips so as to be responsive to bending of the strip.

This double arrangement enables torque measurements to be taken in both directions of rotation of the winding mandrels, i.e. the direction for forward tape travel and the direction for reverse tape travel, without reversing the position of the test cassette on the apparatus. This double arrangement is of particular advantage in auto-reverse cassette decks, for which it considerably speeds up the test procedure.

Each resilient metal strip may be made from phosphor-bronze sheet material and may be clamped to the respective annular member. The resilient metal strip or strips may be comparatively stiff, because the commercially available strain gauges are extremely sensitive.

The end of each resilient metal strip, hereinafter referred to as the far end which is remote from the respective annular member may be connected to an associated guide member which is movable in an associated guide slot in the cassette housing. This provides a low-friction guidance for the far end of each resilient metal strip.

An embodiment of the invention will be described in more detail, by way of example, with reference to the accompanying drawings.

DESCRIPTION OF THE PREFERRED EMBODIMENT

Figure 1:
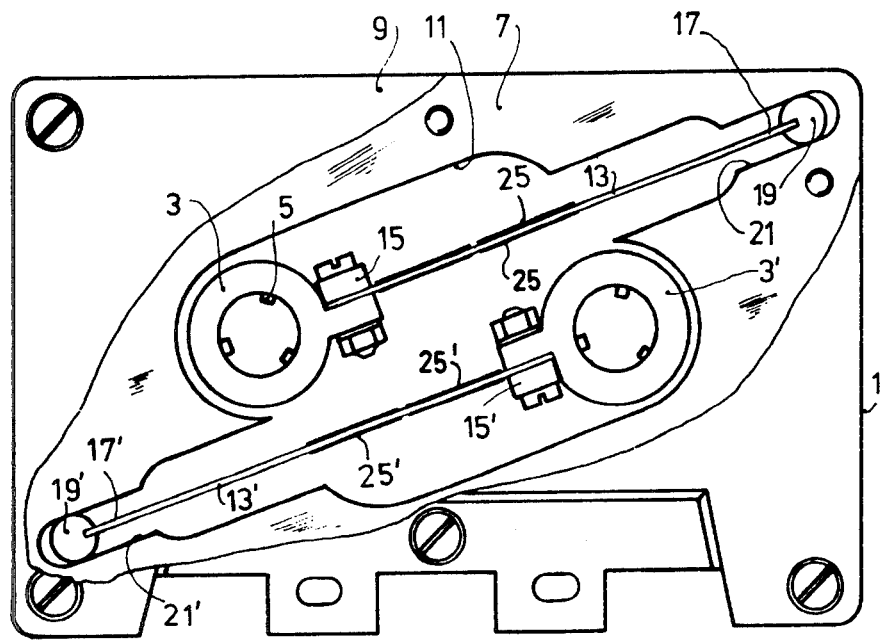
FIG. 1 is a plan view of a test cassette comprising two annular members and associated resilient metal strips with strain gauges.

FIG. 1 is a plan view of a test cassette having the shape and size of a tape cassette of the Compact Cassette type. A Compact-Cassette comprises a housing containing two rotatable reel hubs around and between which a length of a magnetic tape is wound. When the cassette is inserted into a cassette deck, the hubs engage with respective winding mandrels on the cassette deck through internal radial projections on the reel hubs so as to be rotationally coupled to the winding mandrels.

The test cassette comprises a housing 1 which is similar in shape and size to the housing of a Compact-Cassette and which consists of a thick metal or plastic plate 7 covered on one side by a cover plate 9, which is shown partly broken away in FIG. 1. In this side the plate 7 is formed with a shallow cavity 11 in which are disposed two annular members 3 and 3' each having a central axis and internal radial projections 5. These annular members are similar in construction and in their disposition in the cassette housing to the reel hubs of a Compact-Cassette, and for convenience they are hereinafter referred to simply as "hubs". The hubs 3 and 3' are rotatably supported on the bottom of the cavity 11 and are held in the direction of the central axes between the bottom of the cavity and the cover plate 9, which cover plate closes the cavity. In use the test cassette is inserted into a cassette deck in the same way as a Compact-Cassette so that the hubs 3 and 3' engage with the two winding mandrels of the cassette deck. For this purpose, holes are provided in the cover plate 9 and the bottom of the cavity 11 in alignment with the hubs 3 and 3' to receive the winding mandrels. Resilient metal strips 13, 13' are secured at their near ends to the hubs 3, 3' respectively on the outer sides thereof by clamping devices 15, 15' so as to extend radially from the hubs with the lateral directions of the strips extending parallel to the central axes of the hubs. The resilient metal strips may be made from phosphor-bronze sheet and, depending on their use, the length, width and thickness of the strips should be dimensioned in conformity with the modulus of elasticity of the material. The resilient metal strips 13 and 13' extend substantially parallel to one another in opposite radial directions from the hubs 3 and 3'. The far ends 17, 17' of the resilient strips 13, which are remote from the hubs, are secured in roller-shaped guide members 19, 19' respectively. These roller-shaped guide members are slidable in elongated slots 21, 21' respectively in the plate 7, which slots are arranged with their longitudinal axes extending radially or substantially radially with respect to the hubs 3 and 3' respectively.

A strain gauge 25, 25' is cemented or otherwise fixed on each side of each strip 13, 13' respectively.

Figure 2:
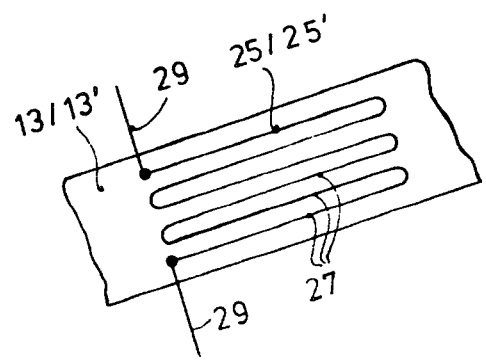
FIG. 2 is a view of one side of a portion of one of the metal strips showing a strain gauge attached thereto.

The strain gauges 25 and 25' are of known form and, as shown in FIG. 2, each comprise a plurality of parallel conductors 27 which are interconnected in a meandering pattern and each of which extends in the longitudinal direction of the respective strips 13, 13'. Via connecting wires 29, each strain gauge may be connected to an electrical or electronic measuring instrument, for example, a Wheatstone bridge.

Upon insertion into a cassette deck the test cassette may disappear almost completely from view. However, via the connecting wires 29 the torque measurement values are transmitted to an external location and therefore it is not necessary for the test cassette to be visible to the person carrying out the test.

When the test cassette is inserted into a cassette deck, the hubs 3 and 3' engage in the manner of the reel hubs of a tape cassette with the two winding mandrels of the deck. When the drive to one or both of the mandrels is switched on, a torque is imparted to the hub 3 or 3' or to both hubs, respectively. The torque causes the respective resilient metal strips 13 or 13' or both metal strips, as the case may be, to bend, so that the length of the respective strip, or of each strip on the convex side thereof, increases and consequently the resistance of the strain gauge attached to that side of the respective strip, or to each strip, varies. The degree of bending and thus the magnitude of the applied torque is thereby transmitted to the measuring instrument to which the strain gauges are connected.

The test cassette need not be removed from the cassette deck and its position thereon reversed for alternatively measuring the torque exerted by the one and by the other winding mandrel. Since each winding mandrel acts on an associated metal strip, it suffices to switch over the cassette-deck function in order to change from measuring the torque of one winding mandrel to measuring the torque of the other winding mandrel.

The resilient metal strips 13 and 13' extend substantially parallel to each other towards two diagonally opposed corners of the housing 1 of the test cassette. Obviously, it is possible to equip the test cassette with only one hub and associated resilient metal strip. Also, it is possible to have a strain gauge on only one side of each resilient metal strip.

What is claimed is:

1. A test cassette for measuring the torque of a winding mandrel of a tape cassette apparatus, comprising
   a housing;
   an annular member having a central axis, said member being rotatably supported in the housing so as to permit rotation about said central axis, and being arranged for engagement with a winding mandrel of a tape cassette apparatus to receive torque therefrom;
   a resilient elongated metal strip having a near end connected to the annular member so as to extend substantially radially therefrom with the lateral direction of the strip extending parallel to the central axis of the annular member, and a far end;
   means for guiding the far end in the housing, so arranged as to permit movement of the far end in a direction such that the strip can bend under the action of torque imparted to the annular member by the mandrel; and
   a strain gauge attached to a side of the strip so as to be responsive to bending thereof.

2. A cassette as claimed in claim 1, wherein the resilient metal strip is a phosphor-bronze sheet material.

3. A cassette as claimed in claim 1, wherein the near end of said strip is clamped to the annular member.

4. A cassette as claimed in claim 1, 2 or 3, wherein said means for guiding comprises a guide slot in the housing, and a guide member connected to the far end of said strip and arranged to be movable in the guide slot.

5. A test cassette for measuring the torques of either of two winding mandrels of a tape cassette apparatus, comprising
   a housing;
   two annular members, each having a respective central axis, each member being rotatably supported in the housing so as to permit rotation about the respective central axis, and being arranged for engagement with a respective winding mandrel of a tape cassette apparatus to receive torque therefrom;
   two resilient elongated metal strips, each having a near end connected to a respective annular member so as to extend substantially radially therefrom with the lateral direction of the strip extending parallel to the central axis of the respective annular member, and each strip having a respective far end;
   means for guiding the far ends of the strips in the housing, so arranged as to permit individual movement of the far ends in directions such that the respective strips can bend under the action of torque imparted to the respective annular members by the respective mandrels; and at least two strain gauges, one respective strain gauge attached to a side of each strip so as to be responsive to bending of the respective strip.

6. A cassette as claimed in claim 5, wherein said strips extend in opposite radial directions from the respective annular members.

7. A cassette as claimed in claim 6, wherein said strips are made from phosphor-bronze sheet material.

8. A cassette as claimed in claim 6, wherein the near ends of said strips are clamped to the respective annular members.

9. A cassette as claimed in claim 5, 6, 7 or 8, wherein said means for guiding comprises two guide slots in the housing, and two guide members, one connected to the far end of each respective strip and arranged to be movable in a respective guide slot.

* * * * *